No. 799,181. PATENTED SEPT. 12, 1905.
A. B. McCULLOCH.
RESAW MILL DOG.
APPLICATION FILED APR. 20, 1905.
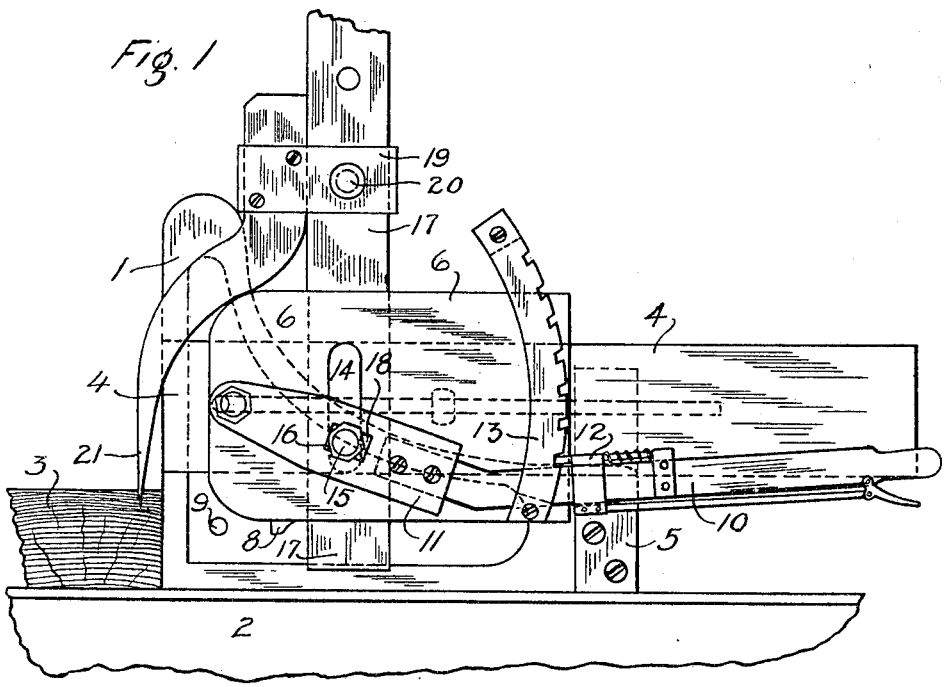
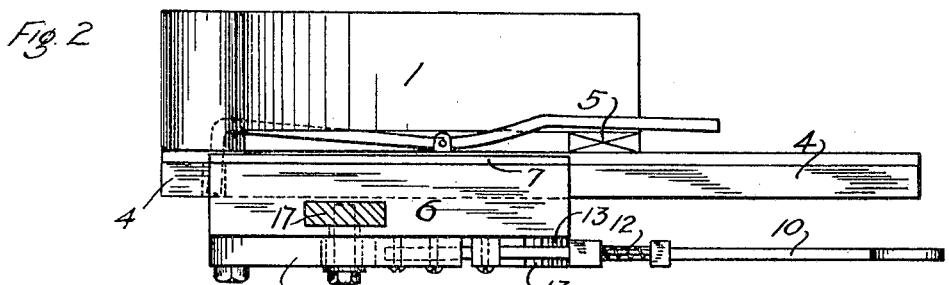
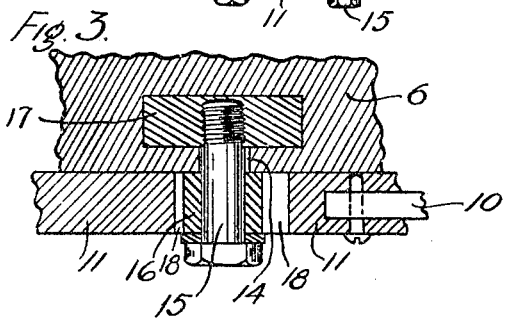
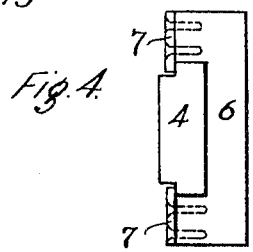
Witnesses
M. A. Van House
B. A. Arnold
Inventor
Arthur B. McCulloch
By R. J. Elliott
Attorney

UNITED STATES PATENT OFFICE.

ARTHUR B. McCULLOCH, OF EVERETT, WASHINGTON.

RESAW-MILL DOG.

No. 799,181.     Specification of Letters Patent.     Patented Sept. 12, 1905.

Application filed April 20, 1905. Serial No. 256,555.

*To all whom it may concern:*

Be it known that I, ARTHUR B. McCULLOCH, a citizen of the United States of America, residing at Everett, in the county of Snohomish and State of Washington, have invented certain new and useful Improvements in Resaw-Mill Dogs, of which the following is a specification, reference being had therein to the accompanying drawings.

This invention relates to sawmill-dogs, and is more particularly an improvement of the receding dog for which I obtained United States Letters Patent dated April 25, 1905, and numbered 787,992.

The object of this invention is to improve the construction so as to enable me to use my dog in a resaw-mill on such lumber known as "three-inch cant." I attain this object by the mechanism illustrated in the accompanying drawings, in which—

Figure 1 is a side view of my dog in use holding a three-inch cant. Fig. 2 is a plan of my dog mounted on a sawmill-carriage knee. Fig. 3 is an enlarged section showing the device connecting the operating-handle to the vertical bar, and Fig. 4 is an end view of the sliding block mounted on the guide-plate.

Similar numerals of reference refer to similar parts throughout the several views.

I find that the link connecting the operating-lever with the vertically-sliding dog-bar, as described in my previous application, prevents my lowering the mechanism so as to bring the point of the dog when in its lowest position sufficiently low so as to engage a piece of timber less than six inches high.

Referring to the drawings, 1 represents an ordinary sawmill-carriage knee mounted in the usual manner on the head-block 2 and adapted to press against the side of the resaw lumber 3. To the side of the knee 1 I have secured the guide-plate 4, extending from the front edge of the knee backward beyond the rear edge thereof. The brace-plate 5 is secured to the rear of the knee 1 and to the guide-plate 4. The upper and lower edges of the guide-plate 4, adjacent to the knee 1, are channeled, as shown in Fig. 4, so as to receive the holding-plates of the sliding block, as hereinafter described.

The sliding block 6 fits on the upper, lower, and outer sides of the guide-plate 4 and has the holding-plates 7 secured to it and projecting over the edges of the plate 4 into the channels formed thereon. The block 6 is substantially rectangular and slides horizontally on the guide-plate 4 and carries the dog mechanism. The lug 8 on its lower edge is adapted to engage the stop 9, secured to the knee in such position as to prevent the block 6 from sliding beyond the face of the knee 1 and the end of the guide-plate 4.

The operating-handle 10 is secured to the casting 11, which is pivotally mounted on the block 6. A spring-latch 12 is mounted on the upper side of the handle 10, having, however, its operating-lever on the lower side of the end of said handle, and engages in suitable notches on the double quadrant 13, secured to the block 6 on each side of the handle 10.

The vertical dog-bar 17 passes freely through a vertical hole in the block 6, and a slot 14 is made in the block 6, so that a pin 15 may pass therethrough into said bar 17. This pin 15 also passes through a bearing-piece 16, which slides in the elongated slot 18 in the casting 11 of the handle, as shown in Fig. 3. Thus any movement of the handle 10 is communicated to the dog-bar 17 through the slot 18, the bearing-piece 16, and the pin 15. The slot 18 is made long so as to allow for the change of radius of the pin 15 from the pivot of the casting 11 in different positions of the handle 10.

A dog 21 is secured by a strap 19 to the bar 17. The pin 20 passes through the strap 19 into holes in the bar 17.

It will be readily seen that this construction will allow me to mount the guide-plate 4 lower down on the knee, thus allowing the dog to engage a much smaller cant. This arrangement, however, necessitates my making the handle 10 bent, as is clearly shown in Fig. 1.

Having described my invention, what I claim is—

In a resaw-dog, the combination with the knee mounted on the carriage, of a horizontal guide-plate secured to said knee, a block mounted on and freely sliding on said guide-plate, holding-plates secured to said block and extending over the edges of said guide-plate whereby said block is retained thereon, a vertically-sliding dog-bar mounted on and sliding with said block and carrying a tooth, a pin secured to said dog-bar and passing through a vertical slot in said block, an operating-handle pivoted to and sliding with said block and having an elongated longitudinal slot therein, and a bearing-piece sliding in said elongated slot and rotatably secured to said pin.

In testimony whereof I affix my signature in presence of two witnesses.

ARTHUR B. McCULLOCH.

Witnesses:
B. E. PADGETT,
WILHELMINA FOREMAN.